United States Patent
Bonner et al.

(10) Patent No.: US 11,836,389 B2
(45) Date of Patent: Dec. 5, 2023

(54) AGGREGATED CONTROL OF REMOVABLE DIGITAL STORAGE MEDIA USING A TRIPLEX DATA STRUCTURING SYSTEM

(71) Applicant: Tape Management Systems, Inc., Hicksville, NY (US)

(72) Inventors: Alfred Bonner, Boca Raton, FL (US); Harrison Pardee Lantz, Pensacola, FL (US)

(73) Assignee: Tape Management Systems, Inc., Hicksville, NY (US)

( * ) Notice: Subject to any disclaimer, the term of this patent is extended or adjusted under 35 U.S.C. 154(b) by 0 days.

(21) Appl. No.: 17/622,445

(22) PCT Filed: Jun. 26, 2020

(86) PCT No.: PCT/US2020/039900
§ 371 (c)(1),
(2) Date: Dec. 23, 2021

(87) PCT Pub. No.: WO2020/264352
PCT Pub. Date: Dec. 30, 2020

(65) Prior Publication Data
US 2022/0253253 A1    Aug. 11, 2022

Related U.S. Application Data

(60) Provisional application No. 62/868,366, filed on Jun. 28, 2019.

(51) Int. Cl.
*G06F 3/06* (2006.01)
*G06F 16/188* (2019.01)

(52) U.S. Cl.
CPC .......... *G06F 3/0664* (2013.01); *G06F 3/0604* (2013.01); *G06F 3/064* (2013.01); *G06F 3/0682* (2013.01); *G06F 16/188* (2019.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 5,438,674 A * 8/1995 Keele ................... G11B 7/0037
703/23
5,455,926 A * 10/1995 Keele ..................... G11B 20/10
711/112

(Continued)

OTHER PUBLICATIONS

R. W. Watson, "High performance storage system scalability: architecture, implementation and experience," 22nd IEEE / 13th NASA Goddard Conference on Mass Storage Systems and Technologies (MSST'05), 2005, pp. 145-159, doi: 10.1109/MSST.2005.17. (Year: 2005).*

(Continued)

*Primary Examiner* — Daniel C. Chappell
(74) *Attorney, Agent, or Firm* — Michael J Porco

(57) ABSTRACT

Embodiments described herein provide systems and methods that allow for the archiving of computer data and computer files by aggregating archival content on various types of Removable Digital Storage Media. The system that supports the archiving is a triplex data structuring system providing at least three separate data pools working in synchrony for the stability of the data. Various methods are described to write data, to read data, to virtualize the data, to store data chronologically, to aggregate small files, to screen for malware, and to create various modes of redundancy that allow for the reconstruction of the system even after catastrophic failures.

17 Claims, 11 Drawing Sheets

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 7,263,574 B2* | 8/2007 | Matsuda | G06F 3/0686 711/111 |
| 7,650,456 B2* | 1/2010 | Matsuda | G06F 3/0605 711/111 |
| 2007/0192360 A1* | 8/2007 | Prahlad | G06F 16/245 |
| 2011/0238906 A1* | 9/2011 | Amir | G06F 3/0686 711/111 |
| 2012/0030179 A1* | 2/2012 | Kauffman | G06F 16/248 711/111 |
| 2012/0179868 A1 | 7/2012 | Haustein et al. | |
| 2014/0337571 A1 | 11/2014 | Sims et al. | |
| 2015/0286545 A1 | 10/2015 | Brown et al. | |
| 2016/0210047 A1* | 7/2016 | Kobayashi | G06F 3/061 |

OTHER PUBLICATIONS

IBM Virtualization Engine TS7700 with R 2.0; Singh et al.; Nov. 2011; retrieved from ttps://www.redbooks.ibm.com/redbooks/pdfs/sg247975.pdf on Jul. 3, 2023 (Year: 2011).*

A. L. Drapeua and R. H. Katz, "Striping in large tape libraries," Supercomputing '93:Proceedings of the 1993 ACM/IEEE Conference on Supercomputing, Portland, OR, USA, 1993, pp. 378-387, doi: 10.1145/169627.169757. (Year: 1993).*

S. -W. Wu and A. Gersho, "Rate-constrained optimal block-adaptive coding for digital tape recording of HDTV," in IEEE Transactions on Circuits and Systems for Video Technology, vol. 1, No. 1, pp. 100-112, Mar. 1991, doi: 10.1109/TCSVT.1991.4519809. (Year: 1991).*

International Search Report and Written Opinion for PCT Application No. PCT/US2020/039900; dated Sep. 14, 2020; eleven (11) pages.

Watson. R.W. High Performance Storage System Scalability: Architecture. Implementation and Experience. In 22nd IEEE/13th NASA Goddard Conference on Mass Storage Systems and Technologies (MSST05) (pp. 145-159). IEEE. Apr. 2005. [retrieved on Aug. 14, 2020]. Retrieved from the Internet:, pp. 1-15.

* cited by examiner

AGGREGATED CONTROL OF REMOVABLE DIGITAL STORAGE MEDIA USING A TRIPLEX DATA STRUCTURING SYSTEM

PRIORITY

This application claims priority to U.S. Provisional Patent Application Ser. No. 62/868,366, filed Jun. 28, 2019, the contents of which are hereby incorporated by reference in its entirety.

Technical Field: The present Invention relates generally to the challenges of managing many computer files spread across a collection of Removable Digital Storage Media devices, and more specifically to the use of a Triplex Data Structure to maintain those files, across many Removable Digital Storage Media devices, in a robust way that limits the possibility of data loss over long periods of storage, even many years or decades.

Background: Countless millions of digital devices today create all types of data in vast quantities. While much of the data seems transient with little need to preserve it, the aggregation of small datasets into "Big-Data" has prompted a desire to archive much of the data that is created daily. In addition, media in all its forms, from video files to major motion pictures to podcasts, are now "born digital" and each of those media compositions, along with their derivatives and versions, are often saved and archived in digital format. Therefore, there is a continuous need to store more and more data, and to do it efficiently, with high reliability and security.

When the data volumes of digital data were small, it was easy to store them on small devices. A new IBM hard drive in the 1980s touted being able to hold a full 40 megabytes, pitifully small by today's standards, but at the time it was meant to hold all of the data any one individual might imagine. Bill Gates, founder of Microsoft™ Corporation, is famously noted to have said years ago that he could not imagine a computer program that needed to occupy more than 64 kilobytes of computer memory to run. Today, even common computer programs can be as large as multiple gigabytes, many times bigger than 64K.

Ultimately with the constant growth in the number and size of digital data, coupled with the desire to store them for many months, years, decades, or even centuries, there is an increased need for technologies to archive computer data.

From its early days in the 1960s and into the 1970s, the computer industry used Removable Digital Storage Media (RDSM). Two popular forms of Removable Digital Storage Media were reel-to-reel tapes and large removable disk-packs. This media was cumbersome but allowed data to be archived in non-volatile form, ostensibly for long periods of time if necessary.

In the 1970s, removable "floppy disks" were invented, and while their capacity was limited (less than a megabyte) they were inexpensive and useful. Over the course of the 1970s, 1980s, 1990s and beyond, the formats and density of removable disks improved to the point where many megabytes and even gigabytes could be stored on a single disk. During that time, solid state devices like thumb drives and SD (Secure Digital) cards also became common.

Simultaneously, the PC market allowed the advent of consumer-grade tape cartridges that were also useful for the non-volatile storage of data, again with many formats but an increasing storage volume, up to 10s of gigabytes.

Today, Removable Digital Storage Media formats are highly prevalent, in the form of SD Cards, thumb drives, writable optical disks, USB drives, Thunderbolt drives, and various forms of digital tape (to name just a few).

The greatest progress and the greatest data densities exist today in digital tape, available in cartridges now spanning many terabytes in volume. Formats like LTO (Linear Tape Open) have used ISO standards to give the computer market confidence that no single vendor would dominate the market with a proprietary system.

While some incarnations of Removable Digital Storage Media have been "block based", requiring advanced external databases to make "blocks" of storage intelligible to other computer programs, most (like thumb drives, USB drives, and SD cards) are "self-describing" and carry an independent file system that makes them portable across many devices.

The last of these general types of device to adopt an on-board file system was digital tape. The advent of the Linear Tape File System (LTFS), itself now an ISO standard, allows even very large, multi-terabyte digital tapes to function with the ease of a thumb drive. However, the challenge has been that as digital storage volumes have increased, each "device" (i.e., separate piece of media) might hold hundreds, or thousands, or many millions of files.

SUMMARY

According to one embodiment of the present disclosure, a triplex (or multiplex) data structure is provided, including a collection of Removable Digital Storage Media (RDSM) devices, a physical library manager to manage the individual elements of the RDSM as well as for aggregating some of their metadata, and a meta-database and orchestration engine that manages both near-line and off-line RDSM, as well as methods for the movement of data files to and from host systems, and the virtualization of files residing in all of the RDSM. The present disclosure includes a file and folder aggregation system deployed in each RDSM device married to a database and file and folder structure visible by all host systems. The present disclosure provides methods and mechanisms to write and read data to and from the aggregated RDSM, and to perform various batch processes including the chronological placement of files, screening for malware, filtering out files that should not properly reside on RDSM based on rules set by host systems, and a method for aggregating small files into larger containers.

According to another embodiment of the present disclosure, a system is provided wherein the above methods manage the inflow and outflow of data files to and from RDSM transparently to host systems. The host systems placing data files on the system need not be aware that their data is in fact being stored on multiple RDSM devices.

According to another embodiment of the present disclosure, a computer program product is provided wherein the above methods and system are presented as a cohesive whole to host systems shielding them from the particulars of the methods and system, providing a simple, familiar, virtualized file system interface for files into and out of the system.

According to one aspect, a system for providing a triplex data structure supporting the management of data archived on a plurality of removable digital storage media (RDSM) includes a plurality of physical libraries configured to manipulate, read, and manage the plurality of RDSM, each RDSM including a self-describing file system; a physical library manager configured to manage the plurality of physical libraries, the physical library manager includes a library database including a device ID and the self-describing file system from each RDMS of each library; an orchestration engine configured to store media metadata associated with files and/or folders on the plurality of RDSM and read and write data to the plurality of RDSM, wherein the orchestration engine sends media metadata to the physical library manager to determine a particular file and/or folder on the plurality of RDSM and receives the determined file and/or folder from the plurality of RDSM; and a virtualization engine for a host system, the virtualization engine configured to provide a contiguous view of all data contained in the plurality of RDSM by providing a file structure created by the media metadata.

According to another aspect of the present disclosure, a method for reconstructing a triplex data structure supporting the management of data archived on a plurality of removable digital storage media (RDSM) comprising: exporting file structures from each discrete RDSM device, each file structure having unique paths and unique filenames within the paths; reading the first exported file structure and aggregating file structures from subsequent RDSM devices to the first exported file structure, creating at least one database table including the unique paths and unique filenames to reference specifically where each path and file can be found on the plurality of RDSM; and assembling the aggregated file structure and the at least one database table, along with the original RDSM, to form an exact copy of the original triplex data structure system.

In one aspect, the aggregated file structure is used to generate unique path and folder numbers that are represented within a database table.

In a further aspect, the at least one database table includes metadata associated with each file.

BRIEF DESCRIPTION OF THE DRAWINGS

These and other objects, features and advantages of the present disclosure will be apparent from a consideration of the following Detailed Description considered in conjunction with the drawing Figures, in which.

DETAILED DESCRIPTION

Figure 1:
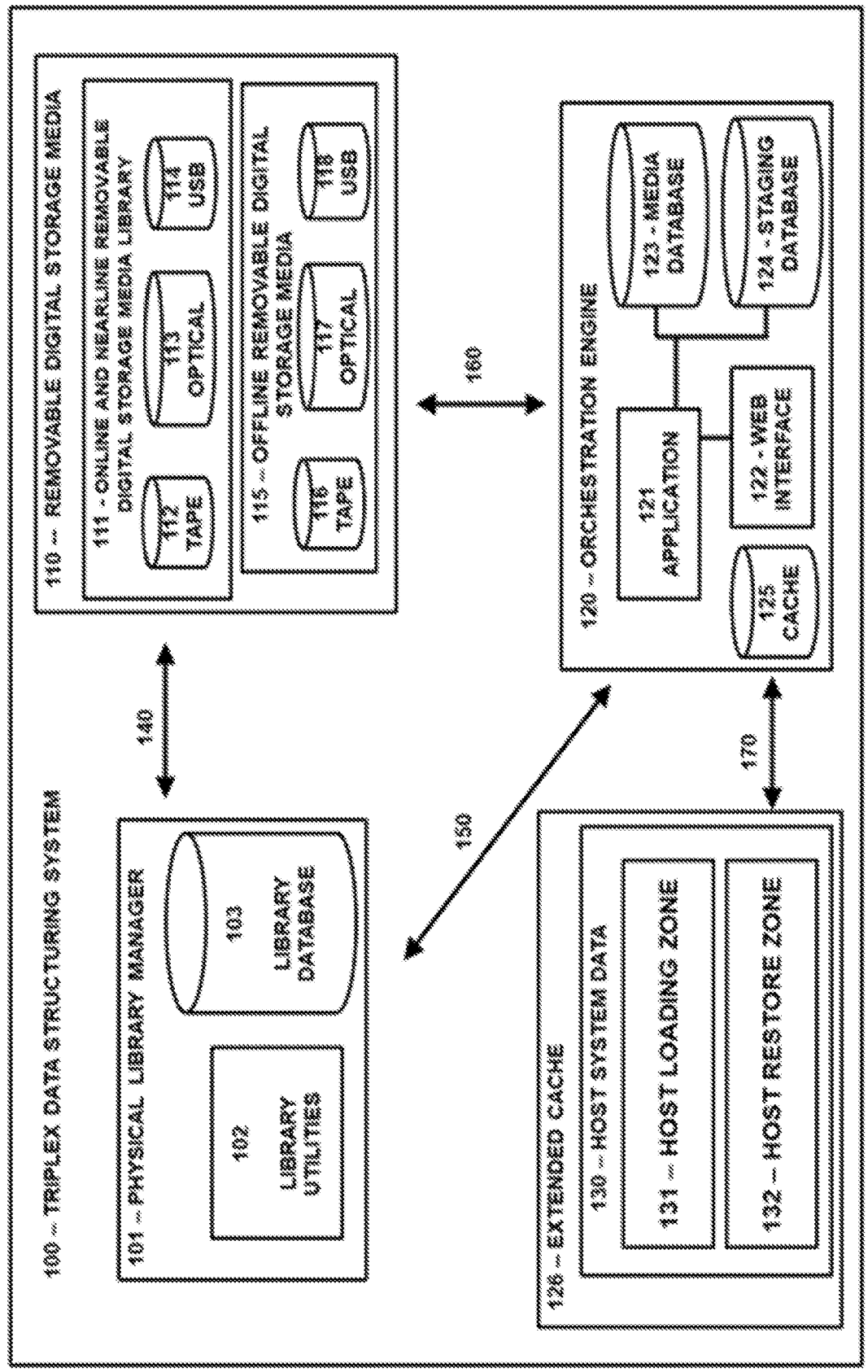
FIG. 1—Triplex Data Structuring System: A high level view of the components of the system in accordance with an embodiment of the present disclosure.

Embodiments of the present disclosure will be described herein below with reference to the accompanying drawings. In the following description, well-known functions or constructions are not described in detail to avoid obscuring the present disclosure in unnecessary detail. The word "exemplary" is used herein to mean "serving as an example, instance, or illustration." Any configuration or design described herein as "exemplary" is not necessarily to be construed as preferred or advantageous over other configurations or designs. Herein, the phrase "coupled" is defined to mean directly connected to or indirectly connected with through one or more intermediate components. Such intermediate components may include both hardware and software-based components.

It is further noted that, unless indicated otherwise, all functions described herein may be performed in either hardware or software, or some combination thereof. In one embodiment, however, the functions are performed by at least one processor, such as a computer or an electronic data processor, digital signal processor or embedded microcontroller, in accordance with code, such as computer program code, software, and/or integrated circuits that are coded to perform such functions, unless indicated otherwise.

It should be appreciated that the present disclosure can be implemented in numerous ways, including as a process, an apparatus, a system, a device, a method, or a computer readable medium such as a computer readable storage medium or a computer network where program instructions are sent over optical or electronic communication links.

Embodiments of the present disclosure will be described herein below with reference to the accompanying drawings.

Definitions a. The terms "Triplex Data Structuring System" and "Triplex Data Structure" will be used to describe the system of the present disclosure as a whole as a virtualized environment designed for the storage of computer data and computer files.

b. The term "Host Systems" will be used to signify any variety of computer systems or devices operating within government, business, education, or with other common users, who wish to store data and data files within a secure environment.

c. The terms "Files" or "Data Files" will used to signify any data, in any form, that a Host System wishes to store in the Triplex Data Structuring System of the present disclosure.

d. The term "Removable Digital Storage Media" will be defined as any computer storage device that can be removed from a computer through some type of conventional port or device. This would include digital tape, USB "thumb" drives, USB Hard Drives, Thunderbolt drives, SD cards, writable Compact Disks, writable DVDs, and any other computer storage device, existing now or in the future, that can be inserted and then removed from either a computer or an array device, like a tape library or an optical "juke box", that can use robotics to move devices into and out of reading devices like tape drives or USB port arrays.

e. The term "RDSM" will be used to mean Removable Digital Storage Media.

f. The term "RDSM Device" may be considered a synonym for RDSM, but more specifically refers to the physical object, the SD card, the digital tape, the optical disk (to name a few) that is the physical embodiment of the RDSM concept.

g. The terms "Reading Device" and "RDSM Reading Device" will define a computer system device that can read and write to a Removable Digital Storage Media device. For example, a robotic tape system may use automation to place a digital tape into a Reading Device. An optical "juke-box" can hold many Compact Disks or DVDs such that when optical media is needed, it is placed into a Reading Device. The present disclosure envisions other Reading Devices conceived but not yet created, for example, a type of "juke-box" that will hold SD cards, or thumb drives.

h. The term "Self-Describing" will be used to mean any RDSM that contains not only computer storage but an internal file system that describes the content on the device. USB drives, LTFS formatted tapes, and writable DVDs are examples of Self Describing devices.

i. The term "File Essence" will be used to mean the actual content of a data file as distinct from the metadata that describes it. For example, a filename, a date of creation, owner permissions, file-size, etc. are all considered metadata—i.e., data ABOUT data. The "essence" of the file is the data pointed to by the metadata. Note that the file essence and the metadata are often available in the same file container, but also often the metadata is represented externally, for example in a database.

j. The term "Virtual Link" will be defined as a type of computer file that points to another computer file. Often a virtual link may contain metadata and NOT file essence, but rather part of the virtual link metadata will point to a file that does contain file essence.

k. The term "File Rehydration" will be used to define a process where a Virtual Link is converted back to the underlying file containing the file essence. Note that although those skilled in the art can determine a virtual link from its underlying file that contains the file essence, many average users will not be able to make such a distinction. Virtual links are used, among other things, to save computer space. A virtual link occupies very little computer space, while the underlying file, including file essence, may be many times its size.

l. The term "File Metadata" will be used to mean data ABOUT data, rather than the underlying data itself.

m. The term "Folder" will be defined as a specific location on a computer determined by its specific directory structure.

n. The term "Folder/File" will be defined as the combination of a computer Folder plus specific filename information. A Filename appended to a Folder yields a Folder/File.

o. The term "Path" will be defined as the aggregate Folder structures that lead to a specific Folder in a computer system.

p. The term "Path/Filename" will be defined as a complete, fully resolved Path plus a unique file name, like a Folder/File, but containing the complete Path.

q. The term "Object Oriented Storage" refers to a type of storage often found in cloud environments typified not by a Folder/File hierarchy, but rather by a collection of uniquely identified computer locations often called "bins".

r. The term "Operating System" will be defined as software, distinct from computer hardware, that controls the way people and other programs interact with the computer. Operating Systems are usually composed of a set of utilities that control, among other things, devices, input/output operations, and how various computer programs and computer code interacts with the computer. Common to almost all operating system utilities are methods for moving computer files from one location on the computer or computer network to another. Examples of Operating Systems are Linux™, Unix™, Microsoft™ Windows™, and Mac™ OS.

s. The term "File System" is defined as an organizational system for files that reside inside of an operating system. Linux™, for example, can contain multiple File Systems. Examples of File Systems are CIFS (Common Internet File System) and NFS (Network File System).

t. The term "Virtualized File System" (or Virtual File System) is defined as a computer software program that mimics a real File System, duplicating much of its functionality, but where another underlying and more concrete file system may perform many of the underlying functions. A common framework for creating Virtualized File Systems is FUSE—an acronym for File System in User Space. (Sometimes referred to as Filesystem in User Space.)

u. The term "Virtual Drive" is defined as a computer software program that mimics a real computer storage device, but where another underlying and more concrete storage device may perform many of the underlying functions.

v. The term "Target" refers to the destination of a file transfer, especially when said file transfer will move data from one media platform, for example a computer hard drive, to a destination device like a computer tape cartridge.

w. The term "Malware" refers to the presence within a file of malicious elements that might cause damage to a computer system. The Malware need not be active but might be a type of Trojan Horse waiting to be activated by some external entity.

x. The term "Duplicate File" or "Duplicate Files" refers to a computer file or dataset that has been copied, where an exact replica of the original file or dataset file has been created, usually on a separate place on the computer. In some use-cases, the original file might be destroyed, preserving the duplicate copy. In other use cases, computer users may wish to maintain two copies of one file as a precaution against file corruption or catastrophic loss.

y. The term "Data Pool" refers to a collection of data sources that act in a coordinated fashion. In the case of systems and methods of the present disclosure, that can mean a specific traditional database, a collection of file metadata instances that act in synchrony, like a file system or a virtualized file system, or a collection of data from similar data devices, like a collection of Removable Digital Storage Media (RDSM) devices either in an array, a robotic system, or seen as a whole even in various online, nearline, and offline states.

z. The terms "Live Files" and "Live File Filtering" in this embodiment refer to a classification of files that, although they may be written to RDSM, must also be kept "live" in an environment, for example on the system's cache, such that a Host application can read a "live" file rather than waiting for it to be retrieved from RDSM. Typically, these files are small metadata files that expedite operations for Host system applications. "Live Files" are the files themselves. "Live File Filtering" is the process that makes determinations about which files are "Live Files."

The systems and methods of the present disclosure are configured to aid in the management of files and computer information spread across many Removable Digital Storage Media devices, to make the data intelligible both in the aggregate and in specific forms, and to make the long-term archiving of data robust, secure, relatively easy, and "safe" by data management standards.

It should be noted that today "cloud" storage systems are highly prevalent and take advantage of massive redundancy to provide data protection. Ultimately, the term "cloud" means "remotely managed" in various data centers around the world. Cloud is suitable for many workloads. However, the following is axiomatic: As datasets increase in size from hundreds of terabytes to many petabytes and beyond, and as the length of retention times increase, sometimes to "forever", the cost of cloud storage can become prohibitive. Therefore, one advantage of the systems and methods of the present disclosure is to reduce the considerable cost of computer storage by allowing users to deploy highly reliable but far less expensive archive methods than cloud techniques.

Traditional techniques for managing multiple complex data structures have created dependencies that made the overall traditional systems brittle and difficult to reconstruct in the face of possible file corruption or catastrophic failure. The only remedy was full system redundancy. A better approach for systems not exclusive to the cloud, and part of the value of the systems and methods of the present disclosure, is to take advantage of both internal redundancy and functionality of archive data structures such that if one of three "legs" of the Triplex Data Structure (described in greater detail below) fails, the failed leg can be reconstituted by the other two. Data systems like the one described in the present disclosure are inherently stable and therefore suitable for very long-term data archiving solutions.

The present disclosure provides for the orchestration of data movement and the coordination of metadata within a Triplex Data Structure to provide stability and advanced functionality to data archive systems. While tape libraries and the ISO LTFS format may be used to manifest the systems and methods described herein, tape libraries and LTFS are not the only types of storage that may be used with the systems and methods of the present disclosure, but rather are an example of one of many aggregated Removable Digital Storage Media (RDSM) that may be used with the systems and methods of the present disclosure. Thumb drives, data cards, USB drives, optical disks, and other present or future devices that store computer data could be used in the systems and methods of the present disclosure. It should also be noted that the specific mechanisms by which data is written to RDSM, be it to LTFS, or optical drives, or other various devices, are merely examples of data-writing mechanisms for use in the systems and methods of the present disclosure. It is to be appreciated that commercially available products and/or other products can be used to perform these write and read operations without deviating from the scope of the present disclosure.

Aspects of the systems and methods of the present disclosure derive from the orchestration of multiple datasets included both within a self-describing RDSM and the metadata around the system to create long-term data stability.

Embodiments of the present disclosure recognize that improvements have been necessary to ensure the resilience and data security of archiving systems. Additionally, these embodiments preserve the existing coherence of data structuring and foldering techniques to those familiar in the art, while maximizing the cost-effective nature of improved Removable Digital Storage Media.

One embodiment herein describes a "triplex" data system, which includes multiple databases (e.g., more than two) acting in synchrony, to perform various functions related to moving files to and recalling data files from various forms of Removable Digital Storage Media.

For the purposes of this discussion, the diagrams and accompanying descriptions should be considered non-limiting embodiments. And certain mechanisms and descriptions, for example of computer switches or disk drives, are omitted so as not to obscure the basic nature of the systems and methods of the present disclosure with unnecessary detail. The descriptions and drawings are given as illustrations of an embodiment of the present disclosure but are not meant to be limiting in nature. Those skilled in the art of this disclosure may be able to re-arrange or substitute various components of the system to achieve the same functional result, and those substitutions or re-arrangements should be considered alternate embodiments of the systems and methods of the present disclosure. It should also be noted that the drawings do not depict any function or mechanism to scale.

Embodiments of the present disclosure will include a generalized hardware architecture, which may include computers and servers with a central processing unit (CPU), "virtual machines" which are computer-like programs running in computer "containers" that act as virtualized computers and servers, computer storage devices like computer disk drives, computer tape cartridges, SD cards, USB drives, Thunderbolt drives, optical drives, and other storage devices not yet invented. In general, these storage devices will hold a form of a file system making them "self-describing." The computing devices may have Random Access Memory (RAM), Read Only Memory (ROM), Hard Disk drives, Flash Storage, Networking capabilities, and various Input and Output (I/O) mechanisms to move data and data files to and from the various systems. In addition, these devices will typically deploy computer monitors, pointing devices, keyboards, or other mechanisms for users to interact with the system.

FIG. 1 illustrates a Triplex Data Structuring System of the present disclosure. In this embodiment, there are three metadata structures working in synchrony to ensure the integrity of data within the system. Those skilled in the art will recognize that more than three data structures can also provide this data integrity, and indeed in embodiments with multiple serial Triplex Data Structuring Systems, more than three components can be at work. But the basics of the science of data integrity demand that although simply duplicative, redundant data can in most cases provide a secure and robust system, triplex structures will be inherently more stable and, in the embodiments of the present disclosure, better able to heal and reconstruct themselves after catastrophic loss. Protection against single or multiple component loss is a feature of the systems and methods of the present disclosure.

The Triplex Data Structuring System 100 of FIG. 1 illustrates the components and dataflows of the system at a high level. In this embodiment, Removable Digital Storage Media (RDSM) 110, may be LTFS tapes 112 and 116, USB drives 114 and 118, optical media drives 113 and 117, and any other self-describing computer media storage device that can reside within a media device manager. In this embodiment, the devices are aggregated within a system than can read each RDSM individually. And although in general a single system will manage a single type of RDSM, like digital LTFS tape, this embodiment contemplates that multiple devices can be managed under a single rubric, or that multiple RDSM systems 110 might exist within the same system. Some embodiments of RDSM 110 may be able to read several RDSM devices simultaneously, for example, an LTFS tape system with multiple drives may be capable of multiple read-heads working at the same time, but within this embodiment, it must be noted each file system that is a part of each RDSM device is a separate entity, and is written to and read from separately. Additionally, the full set of RDSM 110 devices may be either online, that is, being read at any given moment, nearline, meaning within reach of robotic systems within a library, or offline, in a separate location to a library system. In this embodiment, all the RDSM devices are aggregated, whether online, nearline, or offline, within the same logical construct of RDSM 110. Each RDSM device maintains its own self describing file system and independence, and these independent file systems, including folder structures and files, in aggregate, form the first and most stable leg of the Triplex Data Structuring System 100. As will be explained later in FIGS. 2 and 3, rules are enforced while writing data to these components that allow them to act in aggregate, where the combined structures and combined data within all of the RDSM devices form a contiguous data structure that can be assembled from its component devices.

The Physical Library Manager 101 is a device, composed of a computer processor, computer storage, software, and input/output interfaces designed to control physical RDSM libraries 111 envisioned under RDSM 110. The Physical Library Manager 101 may control robotic devices with RDSM 110. Additionally, the Physical Library Manager 101 also contains a Library Database 103 that has knowledge of all of the online and nearline RDSM within RDSM 110. A set of Library Utilities 102 also helps to manage both the RDSM within 110 and the various robotic devices that, in this embodiment, might exist within 110. But with the ability to understand all the online and nearline RDSM within 110, the Physical Library Manager 101 is the second leg of the Triplex Data Structuring System 100. The dataflow between the Physical Library Manager 101 and the RDSM 110 is bidirectional as shown by the bidirectional arrow 140 and includes both control information and metadata.

The Orchestration Engine 120 is the third leg of the Triplex Data Structuring System 100. The Orchestration Engine 120 has several components in this embodiment, including a Media Database 123 that holds all metadata about every file and folder stored on any RDSM 110, a Staging Database 124 that helps to manage the various batch processes that move or manage data going to or from various RDSM and other components of the system, a software Application 121 that includes computer code and computer instructions to interface with and control the Physical Library Manager 101, various RDSM 110, Host System Data 130 located in the Extended Cache 126, and a way to interact with any users of the system through a Web Interface 122. Also, under control of the Orchestration Engine is a data Cache 125 that allows the staging of data to and from Host System Data 130 areas shown in bi-directional arrows 170. Note that the Orchestration Engine 120 sends instructions and receives metadata from the Physical Library Manager 101, depicted by the bi-directional arrows 150. Metadata may include details about a particular file, including, but not limited to, size, create-date, modify-date, and/or location on a particular RDSM device By definition metadata does not include the files actual payload. However, the Orchestration Engine 120 sends and receives physical files from the Cache 125 directly to RDSM 110 depicted in the bi-directional arrows 160, and these files would include the file's payload. It is to be appreciated that some of the metadata will necessarily be fixed in association to a file, and some may be more dynamic, for example, usually related to the file's location on a particular RDSM, on a particular library, or on a particular duplicated system should one exist.

In this embodiment, users of Host Systems 130 are shielded from the internals of the Triplex Data Structuring System 100. Most system "users" will simply be writing and reading data to a virtualized file system. Users or their computer applications write Host System Data 130 to a Host Loading Zone 131 where it is virtualized and processed by the Triplex Data Structuring System. The file virtualization mechanism can be accomplished using various tools known to those skilled in the art. In one embodiment, a technical framework called FUSE, "Filesystem in User Space," is employed as the file virtualization mechanism. In this embodiment, the FUSE subroutines present a file structure to users, i.e., a virtual file system, that appears as if it is in fact a physical device. For example, in the Microsoft™ world, this will be seen as a "drive." In Linux™, the user on the system sees a "mount point." In both cases, FUSE is using data to present a virtual file system. In this embodiment, FUSE performs two functions. First, it interprets data in a datastore, e.g., the Media Database 123, and then FUSE displays the datastore as a contiguous, virtual file system. The virtual file system, in this embodiment, also requires physical storage, which is provided by Cache 125. The physical Cache 125 is then divided logically into Extended Cache 126, which becomes the location where users copy data and files to and from the Triplex Data Structuring System. The FUSE subroutines will be under the control of the Application 121. Since the data is virtualized, users are not aware that the data copied to the virtual file system might still be in their Extended Cache 126, in the Host Loading Zone 131, or archived on RDSM. When users retrieve data files, they are retrieved by the Triplex Data Structuring System and restored either back to the Host Loading Zone 131 or to a separate Host Restore Zone 132. In other embodiments, other restore locations can be established by the system, including file restoration to various cloud locations.

FIG. 1, the Triplex Data Structuring System 100, in this embodiment, shows the fundamental robustness of the system. Data housed in RDSM 110 provides the first component of the triplex structure. The Library Database 103 provides the second component of the triplex structure. And the Media Database 123 within the Orchestration Engine 120 construct provides the third component of the meta-structure. All data structures are synchronized in a way that, should one element of the system fail, it can generally be reconstructed by the other two. The exception to this reconstruction capability would lie in the actual data file essence placed on RDSM, which in more robust embodiments can be duplicated under the RDSM 110 rubric, thus providing redundancy and data stability at the file essence level as well. Redundant data, and redundant metadata capable of being reconstructed after component failure or a catastrophic event are the strengths of the Triplex Data Structuring System.

It will be useful at this point to trace the flow of data through the system 100. Start with a user or user application wishing to archive a computer file or files. The user, through their host system 130, sends a file through normal operating-system file-transfer mechanisms to the Host Loading Zone 131 located within the Extended Cache 126. The Host Loading Zone 131, in this embodiment, can be a virtualized file system developed from the files within Cache 125 coupled with data from the Media Database 123. Double sided arrow 170 shows the flow of information between the Extended Cache 126 and the Orchestration Engine 120, for example, directly to Cache 125. The transferred file metadata is logged into 123 the Media Database, the file metadata is also logged and queued in the Staging Database 124. The Orchestration Engine 120 consults the Physical Library Manager 101 to determine an available RDSM library 111 within RDSM 110. On a set schedule, based on various rules and preconditions, the file essence is transferred to the appropriate RDSM device, 112, 113, 114 located within the RDSM Library 111, at which point the file metadata, its specific RDSM reference, its folder structure and other metadata, for example user permissions, are logged partially in Library Database 103 and also in the Media Database 123. From the standpoint of the Host System 130, a file has been placed in the Host Loading Zone 131 and remains there. But the file itself has been processed by the Triplex Data Structuring System 100, the file has been secured in RDSM 110, or in other embodiments multiple or redundant RDSM 110, and this activity has been performed transparently to the Host System 130. The Triplex Data Structing Systems maintains a virtual link in a virtualized file system exposed through the Extended Cache 126. When a user on the Host System 130 wishes to retrieve a file, the Virtual Link is opened and "rehydrates" the file back to its original position.

In one embodiment, since FUSE is using both a database, e.g., Media Database 123, and physical storage, e.g., Cache 125, to store data, it should be noted that the actual File Essence may or may not be immediately available to the file system for retrieval, and indeed a central part of the systems and methods of the present disclosure is what happens to the File Essence when is has been moved, through various mechanisms, to RDSM 110. Therefore, when a file retrieval is made to the FUSE virtual file system, the logic that ensues is as follows: 1) The user (or user application) finds a file system entry on the virtual file system. 2) When a request is made through host system 130 to subsequently open or copy the file, the Application 121 consults the Cache 125 to see if the physical file essence exists there. 3) If the file essence exists in Cache 125 the file is opened or copied depending on the instructions that were given to the file system entry, which clearly is acting as a proxy for the file itself. 4) If the File Essence is not on the Cache 125, the Application 121 consults the Media Database 123 to determine the actual location of the File Essence, which will be located on one or more RDSM devices. In one embodiment, the Library Database 103 speeds access to the file essence, since the Library Database 103 contains a separate index of file data on each RDSM. The Library Manager 101 also coordinates an automation function that moves the specific RDSM to an appropriate RDSM reading device. 5) When the File Essence is located, it is then copied by the system to the Cache 125, where it can then be opened or copied, depending on the instructions that were given to the file system entry in the virtual file system. Those skilled in the art will recognize that the virtual file system, as presented to users either via web interface 122 or as a virtualized drive or mount point, contains Virtual Links with underlying metadata contained in the Media Database 123. When a file reaches its resting point on RDSM 110, the file essence can be held on redundant RDSM media, and the Library Database 103 and the Media Database 123 hold redundant metadata on the specifics of the stored file. With the creation of redundant file essence and the creation of redundant metadata, the Triplex Data Structuring System is inherently stable for long term archiving of data and data files.

Additional advantages of the Triplex Data Structuring System will be apparent to those skilled in the art. Those advantages include both file redundancy and full system redundancy.

File redundancy within the Triplex Data Structuring System can be achieved by several methods. In one embodiment, duplicate files can be created on a single RDSM device to protect against corruption of any single file. In another embodiment, duplicate files can be created on separate RDSM devices within the same system to protect against both possible file corruption, and failure of a single RDSM device. It is to be appreciated that the part of the system that creates redundant copies is very distinct from the virtual file system. In one embodiment, FUSE, as a framework, maintains unique file system entries in a similar manner to the way a Microsoft™ or Linux™ operating system performs this task. The Microsoft™, or Linux™, or FUSE system simply will not allow two identically named files to exist within the same folder structure. If a user attempts to add a file of the same name to an identical directory, either the first file will be overwritten, in which case a "new" file exists there, or the system issues a warning and does not allow the procedure, usually by renaming the new file, often with either a numeral (e.g. "01") or the words "copy" followed by a numeral. In all cases, the file system is enforcing uniqueness on the file structure. However, it is the nature of the systems and methods of the present disclosure that exact copies of the files can be maintained. In one embodiment, the logic for determining files (or files from specific folders) to be copied is determined by the Application 121, and the registration of that information is held in the Media Database 123. Since the file systems located on each RDSM device also enforce folder/file uniqueness, the usual practice for storing redundant files is to use a second RDSM device. Therefore, when protocols for redundant files are deployed in this embodiment, the paired files are held on separate RDSM devices.

Additionally, full system redundancy within the Triplex Structuring System may be achieved by several methods. In one embodiment, an entire Triplex Data Structuring System can be duplicated, where file additions, changes, and deletes can be updated automatically from the first system to the second system, creating full system redundancy. In other embodiments within the context of each fully redundant system additional file redundancy modes can be deployed.

Finally, in yet another embodiment, more than two Triplex Data Structing Systems can be deployed either serially or in star configurations to cascade redundant data and to protect against possible file corruption, component failures, especially at the RDSM level, and to protect against failure caused by catastrophic events. The various modes for redundancy can be configured and are stored in the Application 121 that maintains the logic for how redundancy and system linking might be performed.

The nature of the Triplex Data Structuring System, and its use of three separate but distinct data pools, is most apparent in the case of system reconstruction after a catastrophic loss. If a full set of properly written RDSM survive a catastrophic event, for example, if a redundancy mode is deployed that has preserved RDSM and nothing else after catastrophic loss of the rest of the system, the full Triplex Data Structing System can be restored, or backwards engineered, from the RDSM alone. Because uniqueness is enforced on each RDSM, the aggregation of all files and all folders, from all RDSM, contain the information needed to reconstruct the Library Database 103 (FIG. 1) and the Media Database 123 (FIG. 1). The rest of the system components are non-archival, in other words, they do not depend in any way on the content of archived data, and therefore, can be constructed from conventional backup systems. In this way, since the RDSM in aggregate contain literally all of the necessary archival data, metadata, and file essence, a full system, using the Triplex Data Structuring System, can be restored from archived RDSM alone, whether in the original system, or from a duplicated system as described in one of the redundancy modes above. It is this inherent stability and endurability of the archived data that is needed in the market and is the chief benefit of the Triplex Data Structuring System.

Figure 2:
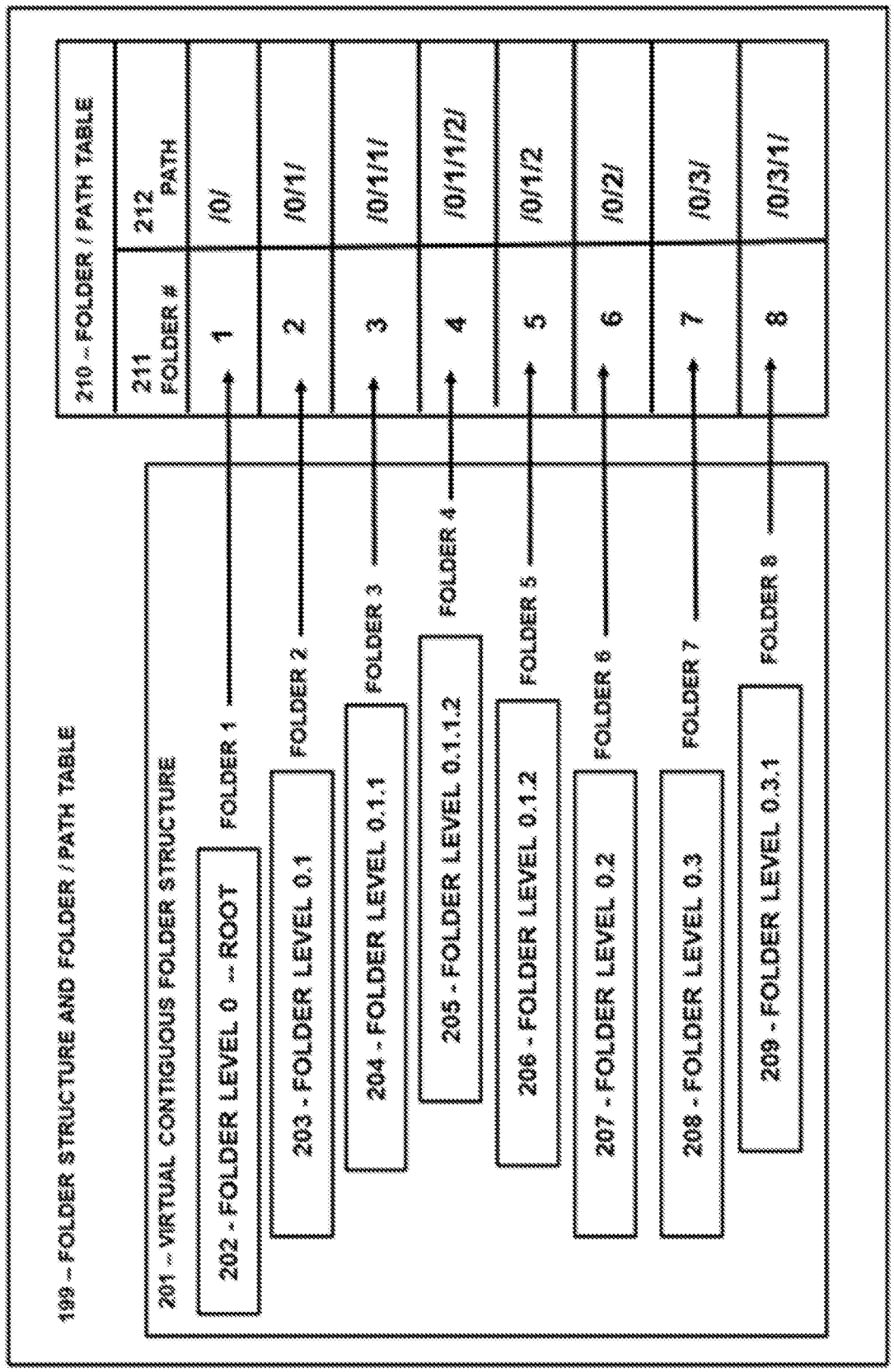
FIG. 2—Folder Structure and Folder/Path Table: A detailed view of the virtual contiguous folder structure across all RDSM devices in accordance with an embodiment of the present disclosure.

FIG. 2 shows in this embodiment the Folder Structure and Folder/Path Table 199, which is stored in media database 123. Host Systems 130 "see" over the network a Virtual Contiguous Folder Structure 201 maintained with the rules associated with a normal network file system. The Folder/File Structure is generated by the FUSE file system which in turn uses data located in the Media Database 123 to maintain the Virtual Contiguous Fold Structure 201. Specifically, uniqueness is guaranteed at both the Folder and Folder/File level. Within the Virtual Contiguous Folder Structure 201, the various Folders are identified 202-209 by their relation to one another. Those familiar in the art will recognize this as a file structure and folder system like CIFS or NFS, both file systems, available commercially on Microsoft™, Linux™, and Apple™ operating systems to name only a few. Other file systems follow similar Folder/File structures, and even object-oriented storage uses unique Bins or other unique containers to hold files. Note that each Folder Level 202-209 is unique and cannot be duplicated within the system, as that would violate operating system rules for uniqueness. As depicted in 202-209, each Folder level can be identified within a unique numbering system. This embodiment shows a Folder system three levels deep, while in fact a file system can be of nearly unlimited depth and breadth, and the three levels shown here are only to illustrate the concept of uniqueness between various Folder levels.

Within this embodiment, to achieve speed in accessing and storing files and to aid in the requirements of uniqueness needed for system restoration, a meta-index is maintained that gives a unique Folder Number 211 to each Path 212 within the Folder/Path Table 210. The Folder/Path Table 210 is part of the Media Database 123 and plays a significant role in maintaining a unique Folder/Path structure that can be spread across the various File Systems, 222-226 (FIG. 3), on the various RDSM in the system. In this embodiment, one and only one specific Path 212 is permitted for each unique Folder #211. By enforcing this database rule, uniqueness of the Folder/Path structure can be maintained.

Figure 3:
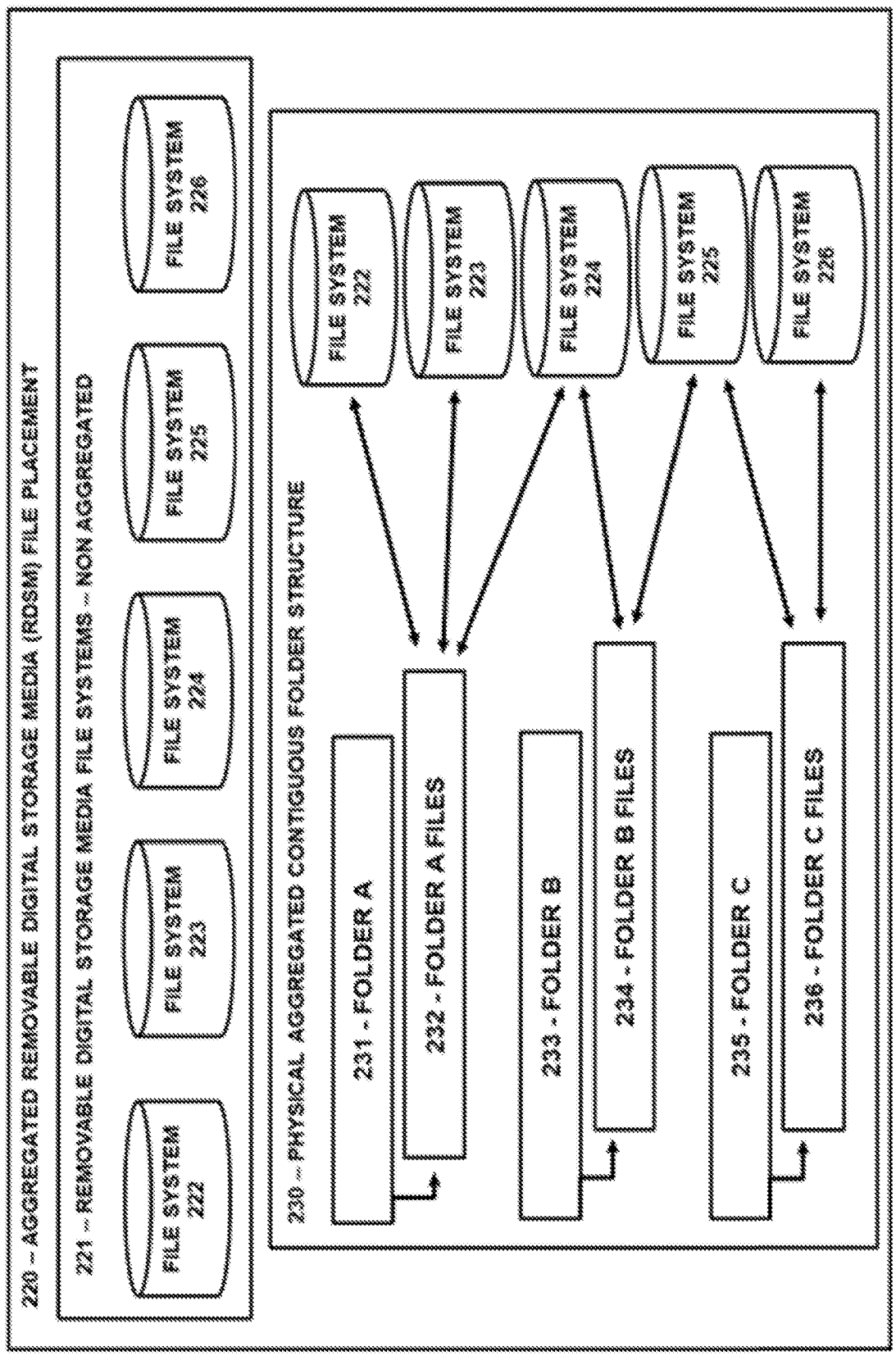
FIG. 3—Aggregated Removable Digital Storage Media (RDSM) File Placement: A detailed view of how files are placed across the virtualized folder structure in accordance with an embodiment of the present disclosure.

FIG. 3 shows in this embodiment the Aggregated Removable Digital Storage Media File Placement across RDSM 220. Once a unique folder system has been established by the Folder Structure and Folder/Path Table 199, files can reliably be spread across various RDSM. Within the constructs governing Aggregated Removable Digital Storage Media File Placement 220, the diagram shows various RDSM 222-226 in a non-aggregated state, each independent and self-describing, but isolated in their utility. However, showing a Physically Aggregated Contiguous Folder Structure 230, the same RDSM 222-226 have been given a Folder system and subsequent files that maintain the unique aspects of the aggregated File System view.

In this embodiment, a File System that has followed Operating System rules for creating unique instances of Paths and Filenames is spread across various RDSM such that each relevant element of the various Paths and their Filenames exist also in the RDSM. As shown clearly in 230, not every File System of every RDSM device has all of the Path metadata, but in aggregate, all of the File Systems on the RDSM 222-226 will be able to recreate the meta-structure of the full File System. The rules for unique Paths and unique Filenames within those Paths are foundational to the inherent stability of the Triplex Data Structuring System. Meta-structures of the full File System can be created from the data on the RDSM as follows: 1) File structures from each discrete RDSM device can be exported to a new folder on a separate computer and used to recreate that device's file structure. 2) Since rules for unique Paths and unique Filenames within those Paths have been followed, subsequent RDSM devices can be read and file structures added to the first exported file structure. By adding file structure data from all available RDSM, the full virtualized file system will have been recreated from its component parts. 3) Additionally, the unique Paths and Unique Filenames can be added to various database tables used to reference specifically where each path and file can be found. 4) The newly aggregated file structure and the new database tables can then be assembled, to recreate the media database 123 and library database 103, along with the original RDSM, to form an exact copy of the original Triplex Data Structuring System.

Figure 4:
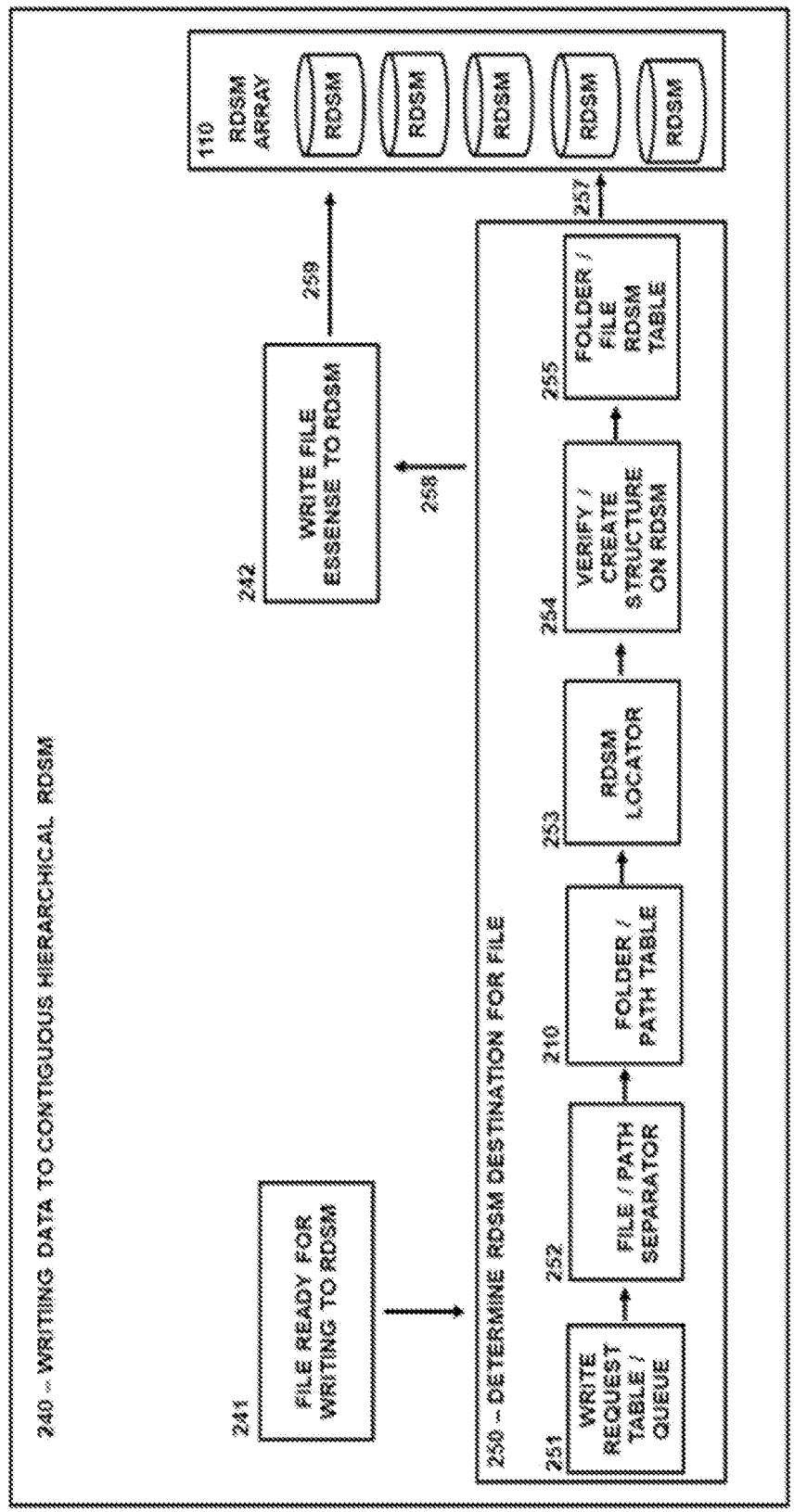
FIG. 4—Writing Data To Contiguous Hierarchical RDSM: The methods for writing data files across virtualized, aggregated RDSM in accordance with an embodiment of the present disclosure.

FIG. 4 shows in this embodiment a method for Writing Data To Contiguous Hierarchical RDSM 240. The method of FIG. 4, Writing Data to Contiguous Hierarchical RDSM is logic performed by the Application 121 requiring data from both the Staging Database 124 and the Media Database 123. Within this construct, two things are important. First, prior to writing a File to RDSM, the system (e.g., Application 121) must guarantee that the unique Path structure exists on the individual RDSM, and if it does not exist it must be created. Therefore, when a file is determined ready to be written to RDSM 241, a process occurs to determine the RDSM destination for the file 250.

In this embodiment, all files needing to be written to RSDM 110 are organized into a Write Request Table/Queue 251. Sometimes, in the case of files that must be written immediately, there may be only one file in the queue. But in general, writing to RDSM is a batch process and many files are organized before the write process begins. Further processing these files to be written to RDSM, they are analyzed and separated by their various File and Path Structures 252 and a lookup function occurs on the Folder/Path table 210 to find the unique number of the Path. Unique Path Numbers and Unique File Numbers are maintained in the Media Database 123. This unique Path number speeds the system (e.g., Application 121) in finding either the RDSM that has the target Path, or in identifying an RDSM that is big enough to hold the target file, but where the Path must be written to the RDSM 253. If there is no room on an existing RDSM that has the Path already written, then a new RDSM is found (e.g., by Application 121) and the Path will be written to that RDSM shown by the arrow 257. It is to be appreciated that even though the system may have two RDSM devices with the same Path, the system (e.g., Application 121) will guarantee that the files themselves, across the aggregated Paths, are unique. Therefore, the same Path structure on one or more instances of RDSM is allowed by Application 121, but the same Path/Filename is NOT allowed by Application 121 on two or more separate RDSM instances. The only exceptions to this rule are when the system has been instructed to make duplicate files, or when the Triplex Data Structuring System has been duplicated, one or many times, in its entirety.

Once the unique Path has been either verified or created on the RDSM 254, a unique file number is created for the unique Path/Filename combination. That file number is logged in the Media Database 123. Finally, instructions are given to Write the File Essence to RDSM 242, depicted in arrow 258, and the file is transmitted, shown in arrow 259, to the specific device in the RDSM Array 256. The instructions and needed workflow to create the target Path, to pass log information to the Media Database 123, and to copy the File Essence to the RDSM are part of the Application 121, which contains the logic and computer instruction sets to manipulate file movements within the system. Every file in the system appears in the Folder/File RDSM Table 255 that is part of the Media Database 123. The functions of the Folder/File RDSM Table 255 are further explained in the description for FIG. 5.

Figure 5:
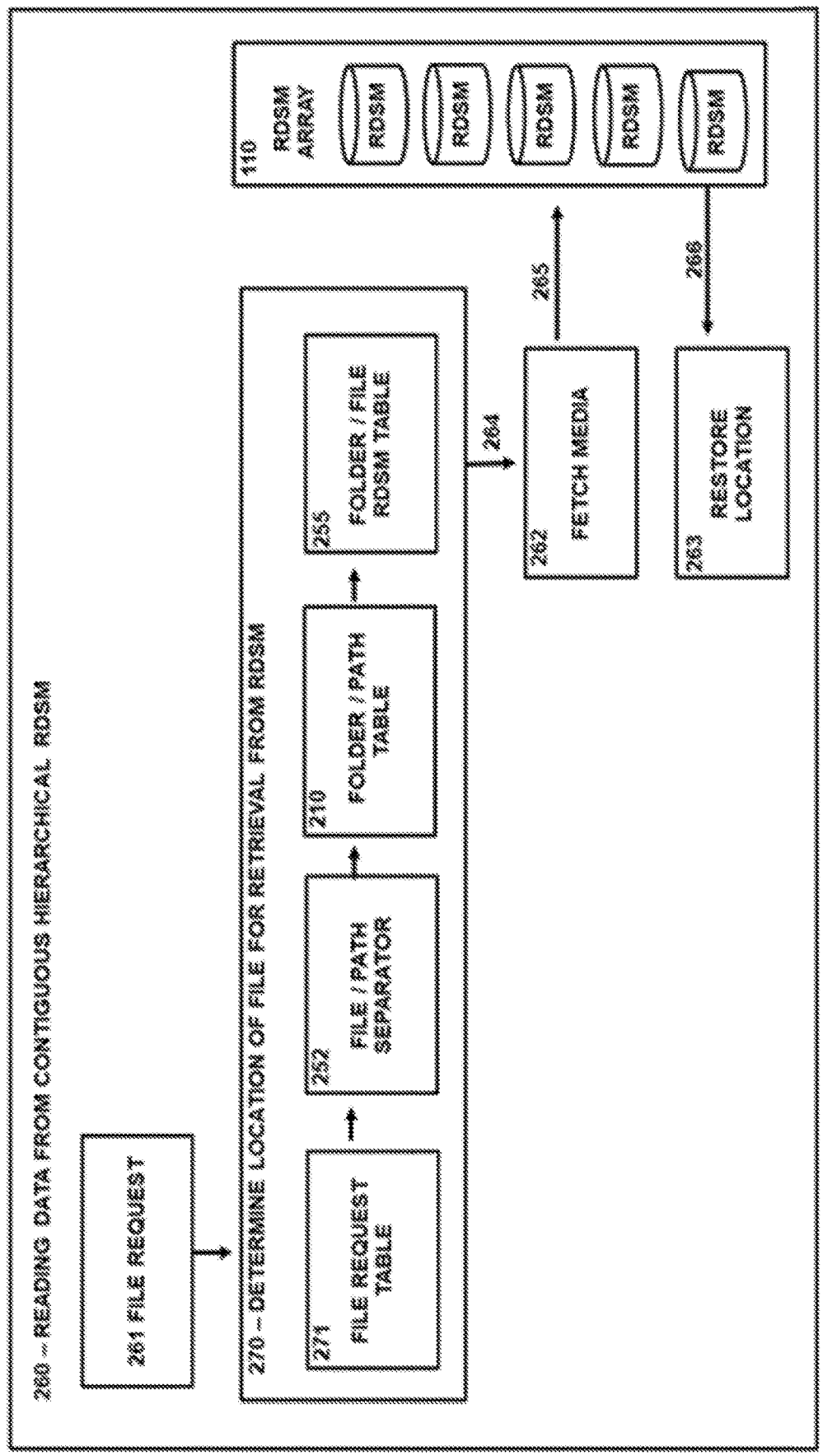
FIG. 5—Reading Data From Contiguous Hierarchical RDSM: The methods for reading and fetching data across virtualized, aggregated RDSM in accordance with an embodiment of the present disclosure.

FIG. 5 shows in this embodiment a method for Reading Data From Contiguous Hierarchical RDSM 260. The method of FIG. 5, Reading Data from Contiguous Hierarchical RDSM is logic performed by the Application 121 requiring data from Media Database 123. When reading or fetching a file from the system, it must be determined which RDSM holds the file such that the RDSM device can be retrieved and put into the appropriate reading device. In the case of an LTFS tape, for example, a tape cartridge that has a file or files for retrieval must first be selected by the system's robotics and inserted into a tape drive. This robotic activity occurs within the RDSM Array 110, the particulars of which are not required for the understanding of this embodiment. The depiction in 260 shows the process for reading or fetching a file that is performed by Application 121. First, the system (e.g., Application 121) issues a File Request 261 and then the system (e.g., Application 121) launches a process to Determine the Location of a File For Retrieval From RDSM 270. Requests for files are queued into a File Request Table 271 so that the retrieval processes can be optimized and performed in a batch mode. File metadata is then subjected to a process, the File/Path Separator 252, that breaks apart the file Path from the Filename. In this way the file Path can operate on the Folder/Path Table 210 to determine the unique Path and path number of the file. This unique number for the Path aids in rapidly finding the file within the Folder/File RDSM Table 255. Every file in the system appears in the Folder/File RDSM Table 255 that is part of the Media Database 123. All tables referenced in the processes of FIGS. 4 and 5 determine the RDSM destination for file 250 and determine the location of file 250 for retrieval from RDSM 270 are located in the Media Database 123. Once a file is found, it's specific RDSM can be determined and then retrieved by the system (e.g., Application 121).

At that point, knowing the Path, Filename, and specific RDSM device, a Fetch Media command 264 is issued to the Fetch Media 262 process. That process communicates 265 with the RDSM Array 110 that finds the needed RDSM and moves the file 266 to the specified Restore Location 263. The Restore Location 263 can be configured to write files anywhere within the system, including to Cache 125, to the Host Restore Zone 132, or to other network locations including configured Cloud locations. If the RDSM is not within reach of the robotic mechanisms in the RDSM Array 110, then the specific RDSM device is offline and must be inserted manually into the Array for the process to proceed.

The batch operation and/or logic for mechanisms described in FIGS. 6 through FIG. 11 below are controlled by Application 121.

Figure 6:
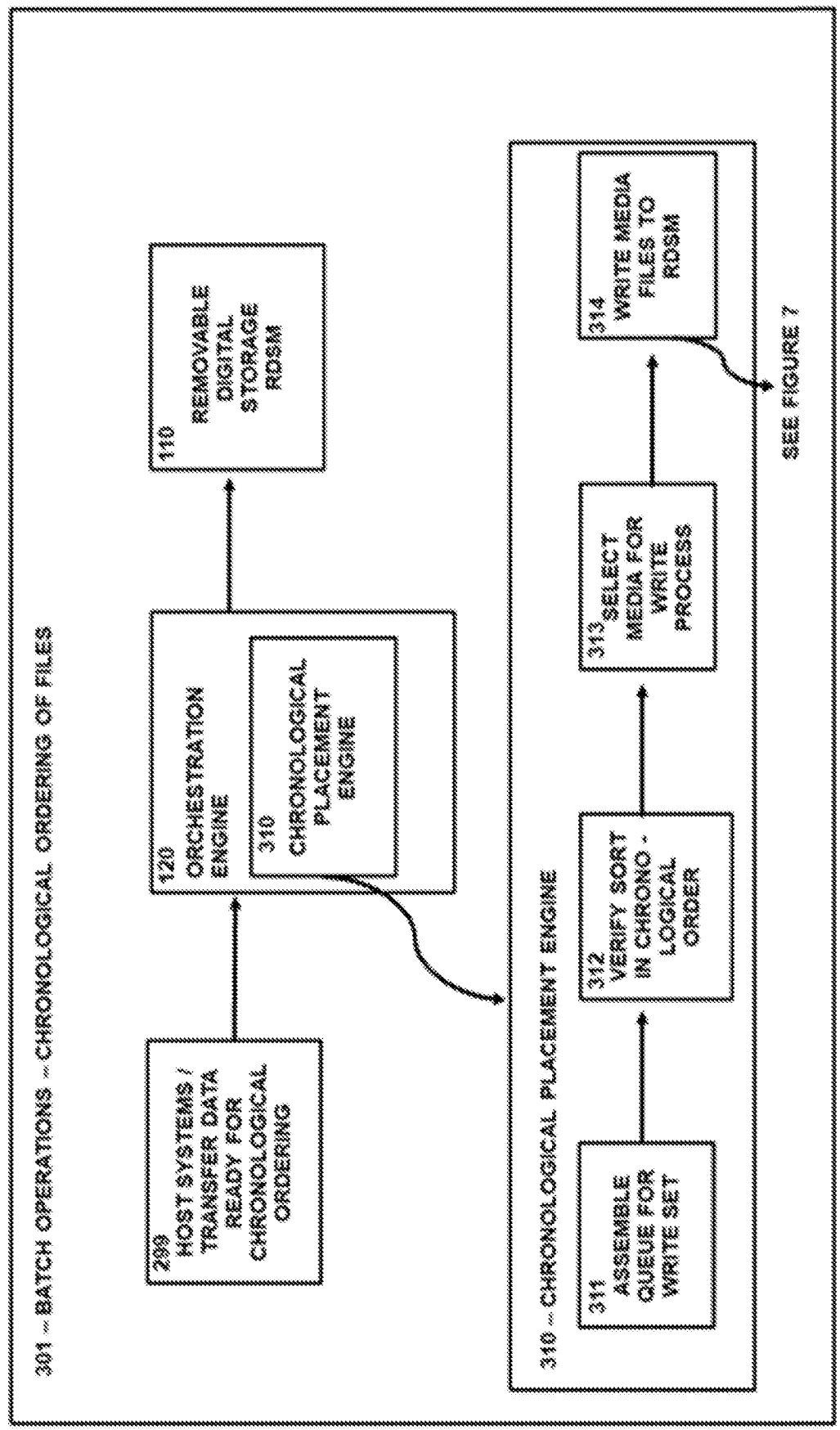
FIG. 6—Batch Operations—Chronological Ordering Of Files: The methods for placing files across virtualized, aggregated RDSM in chronological order in accordance with an embodiment of the present disclosure.

FIG. 6 shows in this embodiment a batch operation for the Chronological Ordering Of Files 301. The Staging Database 124 (FIG. 1) holds metadata for files that will be processed later in certain ways. When files, in batch mode, are ready to be written to RDSM, they can be processed and ordered by Application 121 for ease of use on retrieval, or for other purposes. The general dataflow in FIG. 6 shows Host Systems 130 ready to Transfer Data Ready For Chronological Ordering 299. Chronological ordering is especially useful when a collection of data files has been assembled from time-based sensor devices like surveillance cameras. Chronological ordering can optimize the retrieval of these files from RDSM. Files transferred to the Orchestration Engine 120 (FIG. 1) are held in the Staging Database 124 (FIG. 1) and are then processed by a Chronological Placement Engine 310 prior to being written to RDSM 110. (Note at this time that other batch processes will follow the same basic dataflow.)

Detail of the Chronological Placement Engine 310 is shown in FIG. 6. First, the metadata for selected files is Assembled into a Queue to create a Write Set 311. If the assembled files were not in chronological order, their ordering can be verified in Verify Sort In Chronological Order 312. During this process, other sort-ordering can be supplied, for example by location or by sensor. In surveillance applications, often metadata about sensor (e.g. camera) or recording location can be held in the actual file name rather than in organized computer fields, and logic can be applied by engine 310 during this part of the process 312 from data either in actual metadata fields or contained as part of a file name. Additionally, not all files may be selected to be written, and the process Select Media For Write Process 313 is where that logic is applied by engine 310. For example, certain regulations allow medical images to be changed by medical professionals up to three days after they were created, therefore users may not wish to commit certain files to RDSM until those days have passed, since the underlying file might change in that time. Finally, in Write Media Files To RDSM 314 files will be written to disk. Further detail about Writing Media Files In Chronological Order To RDSM 314 can be seen in FIG. 7.

Figure 7:
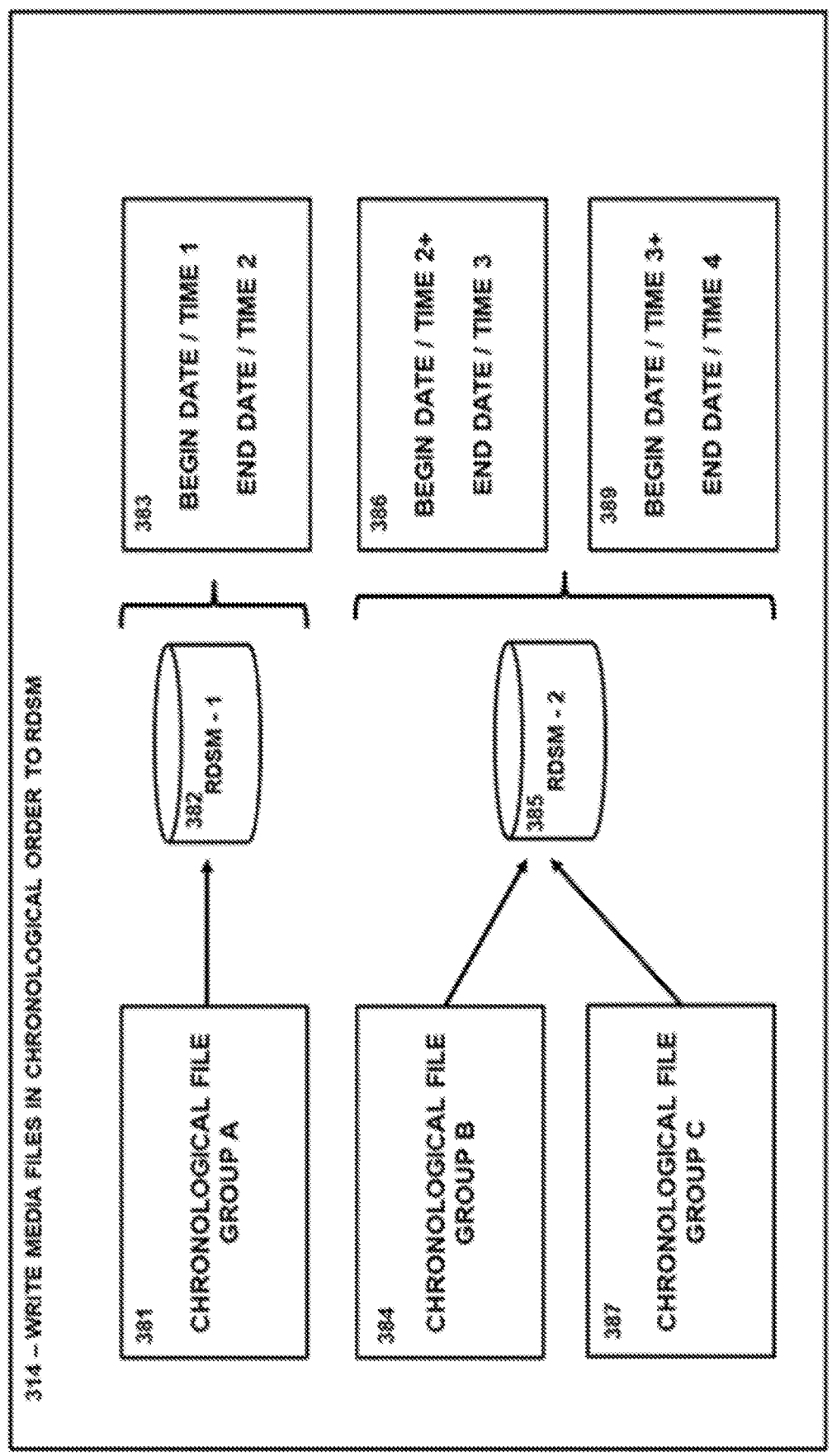
FIG. 7—Write Media Files In Chronological Order: Further detail about writing files to virtualized, aggregated RDSM in chronological order in accordance with an embodiment of the present disclosure.

FIG. 7 shows in this embodiment further detail of Writing Media Files In Chronological Order To RDSM 314. To restate, the purpose of writing files to RDSM in chronological order is to create ease-of-use for the expected use-case of file retrieval. In this embodiment various groups of files 381, 384, 387 are organized during each batch file-write operation. The diagram depicts only one embodiment and is not meant to imply that that there will only be three groups of Chronological Files. Rather this diagram is illustrative of the fact that many groups of Chronological Files can be processed, but each in a similar way.

One or more Chronological File Groups can be placed in an individual RDSM depending on the size of the aggregate file group and the remaining room left on the RDSM. In the FIG. 7, Chronological File Group A 381 is placed on RDSM-1 382 with Begin Date and End Date for the files as specified in 383. Note that the date determination can be up to the user, such that it might be a create-date for a file, a date that the file was last written to, etc. The specific date in the metadata that is used is immaterial to the systems and methods of the present disclosure. In a like manner, two file groups, Chronological File Group B 384 and Chronological File Group C 387 can be, in this embodiment, both written to the same RDSM-2 385 with Begin and End dates as specified in 386 and 389 respectively. For all files in the overall process, the placement of these files is recorded by Application 121 in the File System of each respective RDSM 382 and 385, as well as in the Media Database 123 (FIG. 1).

Figure 8:
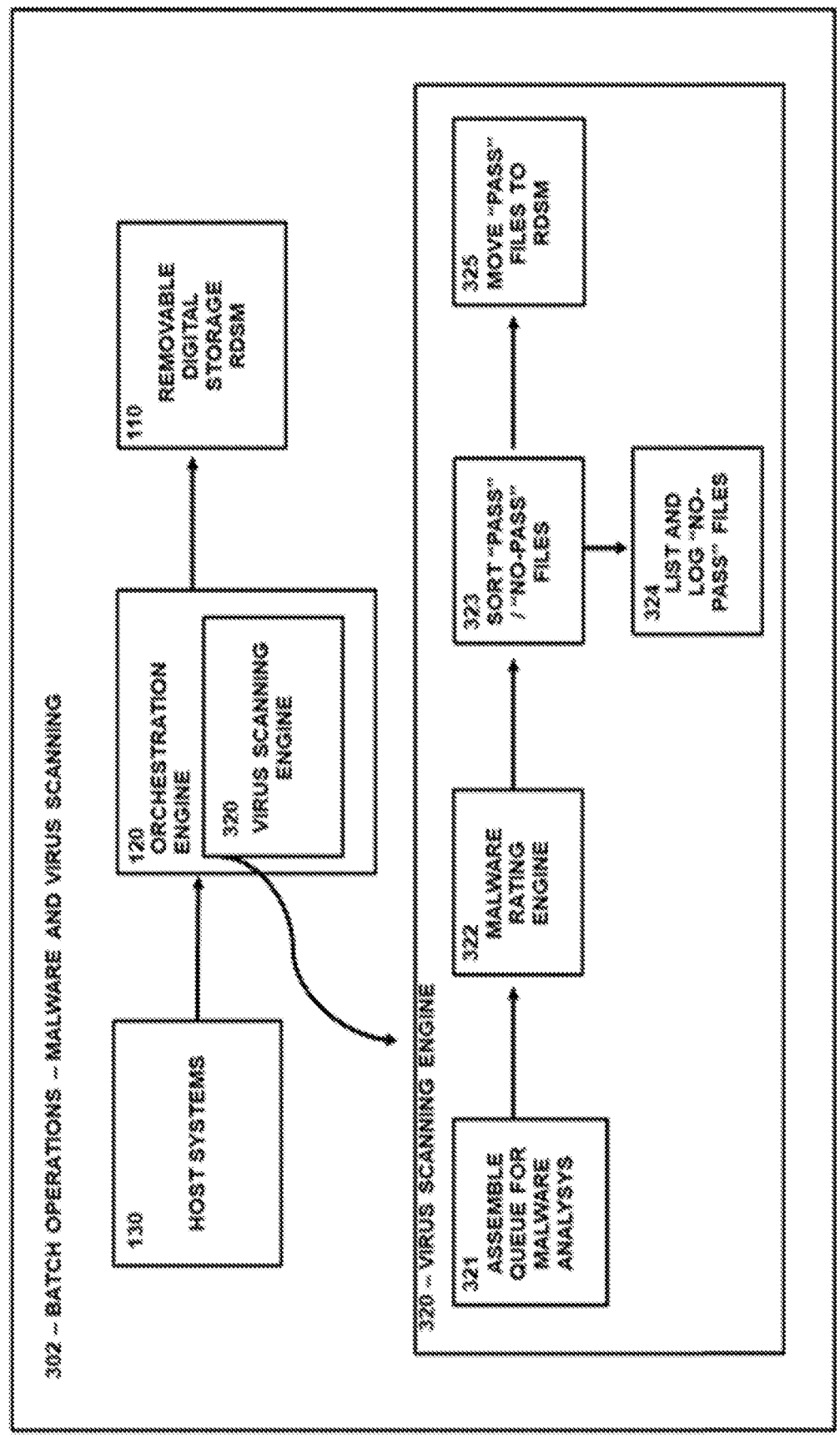
FIG. 8—Batch Operations—Malware and Virus Scanning: The methods for screening for malware before placing files across virtualized, aggregated RDSM in accordance with an embodiment of the present disclosure.

FIG. 8 shows during a batch operation a method in this embodiment for Malware and Virus Scanning 302 performed by orchestration engine 120. The system allows for pre-processing of files (e.g., by engine 120) before they are committed to RDSM 110 for what may be long-term archiving. With the prevalence of malware today, even with other malware detection systems at work, files can be screened before placement. The general workflow is shown where the Host Systems 130 submit files to the Orchestration Engine 120 where they are processed by the Virus Scanning Engine 320 of engine 120 before they are sent to the RDSM repository 110.

During a batch process performed by engine 320, files can be Assembled in a Queue For Malware Analysis 321. Often the presence of Malware, or lack of Malware, is a subjective judgement and therefore files can be rated with a likelihood that they contain malicious elements. In this embodiment, a Malware Rating Engine 322 of engine 320 performs this task. Later in the process in this embodiment a Pass or No-Pass determination is made 232 and usually No-Pass files are logged for further processing, and NOT moved to RDSM. Finally, files that have been cleared by engine 320, whatever the criteria, are written to RDSM 110 in step 325.

Figure 9:
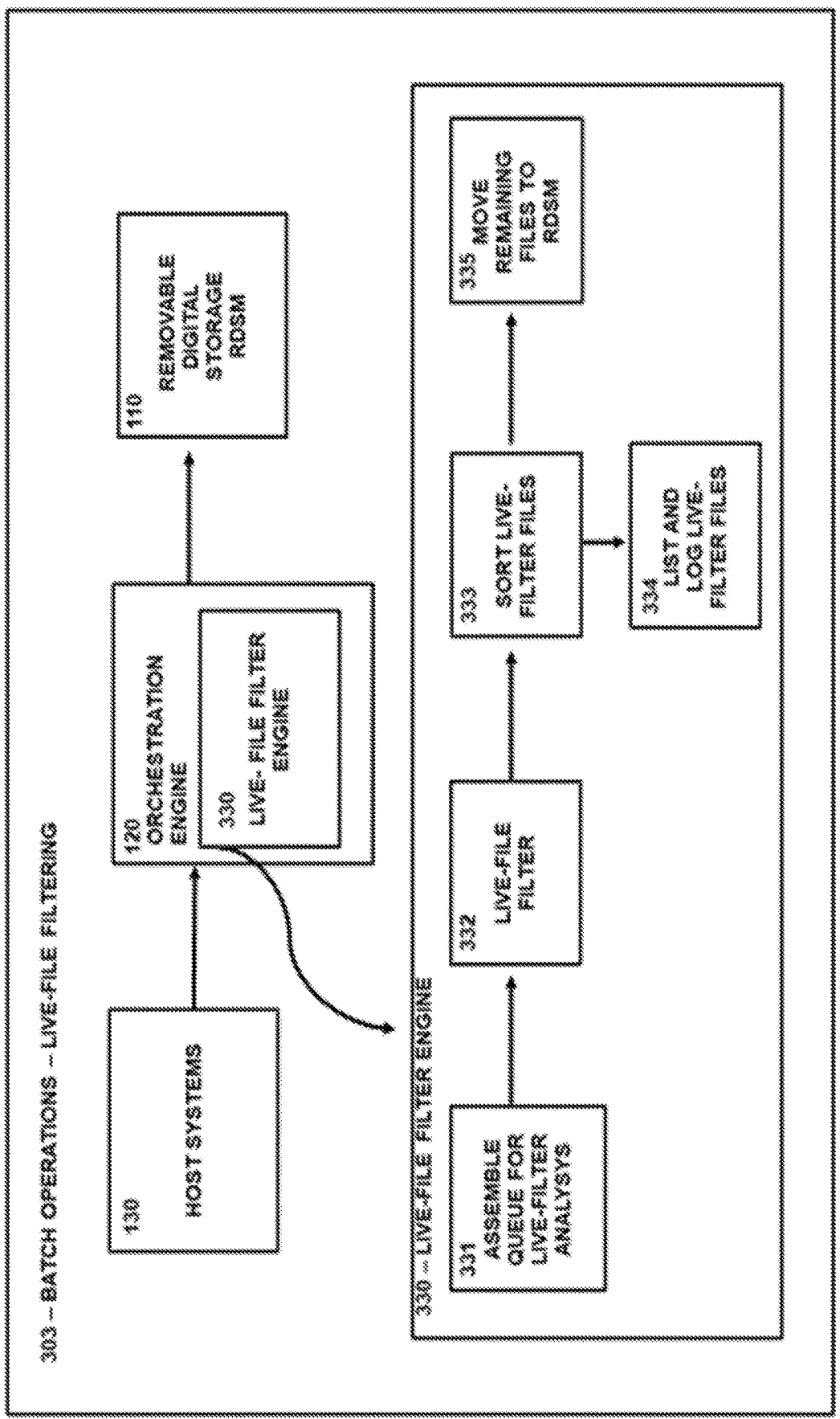
FIG. 9—Batch Operations—Live-File Filtering: The methods for filtering files across virtualized, aggregated RDSM, wherein some files, in addition to being written to RDSM, also exist "live" and available to host system rules in accordance with an embodiment of the present disclosure.

FIG. 9 shows during a batch operation a method performed by engine 120 for Live-File Filtering 303. As noted, it will often be other computer applications rather than individual users that will interact with the Triplex Data Structuring System and Virtualization system of the present disclosure to store files in RDSM. While certain type of RDSM allow random access to files and can be assembled more or less as "live" repositories, digital tape is different in that is an append-only medium—meaning files can be written to it, and in some ways overwritten, but by and large files are addressed in a serial manner. An instruction to fetch a file from tape necessitates the tape to spin to the proper location to find a file. The delay of a tape system in finding a file is called tape latency. There are places where the overall system improves on tape functionality, and this diagram depicts one such area.

For Host-based computer programs and applications whose requirements dictate that some files remain "live" on the system, defined as available in a file cache, usually since these files need to be accessed without tape latency, the engine 120 accommodates these applications by being able to leave certain "live" files on the Extended Cache for the Host 126 (FIG. 1) while other files can be processed onto RDSM through normal operations. The files that are not processed to RDSM, but are rather left on the Cache 125 (FIG. 1), yet visible to the Host in a virtualized version, are called, in this embodiment, "Live-Files."

In this embodiment, files are sent from the Host 130 to the Orchestration Engine 120. Files are then run through a Live-File Filter Engine 330 where the appropriate files are then sent to RDSM 110. Within the Live-File Filter Engine 330, files are assembled in batches 331 and then analyzed by a Live-File Filter 332 that will tag certain files as Live-Files, e.g., sometimes by file name, sometimes by their presence in a specific folder or sub-folder, sometimes by file size (e.g., below a predetermined file size), or sometimes by other criteria. All files in the batch are sorted in 333. The files listed as Live-Files are logged in Extended Cache for the Host 126 in 334, and the remaining files are processed normally 325 to reside on RDSM. Therefore, a portion of the processed files, e.g., non-live-files, are transmitted to at least one RDSM 110 and a second portion of the processed files are stored in the cache 126 of the host system 130 for faster retrieval when requested, compared to the files stored in the at least one RDSM 110. When a file is selected for use, determining if it is "live" is a binary operation. If the file is a Virtual Link, the file is not "live" and the full file needs to be retrieved with a file retrieval mechanism, described herein. If the file is not a Virtual Link, the file is "live" and can be used immediately by a host application.

Figure 10:
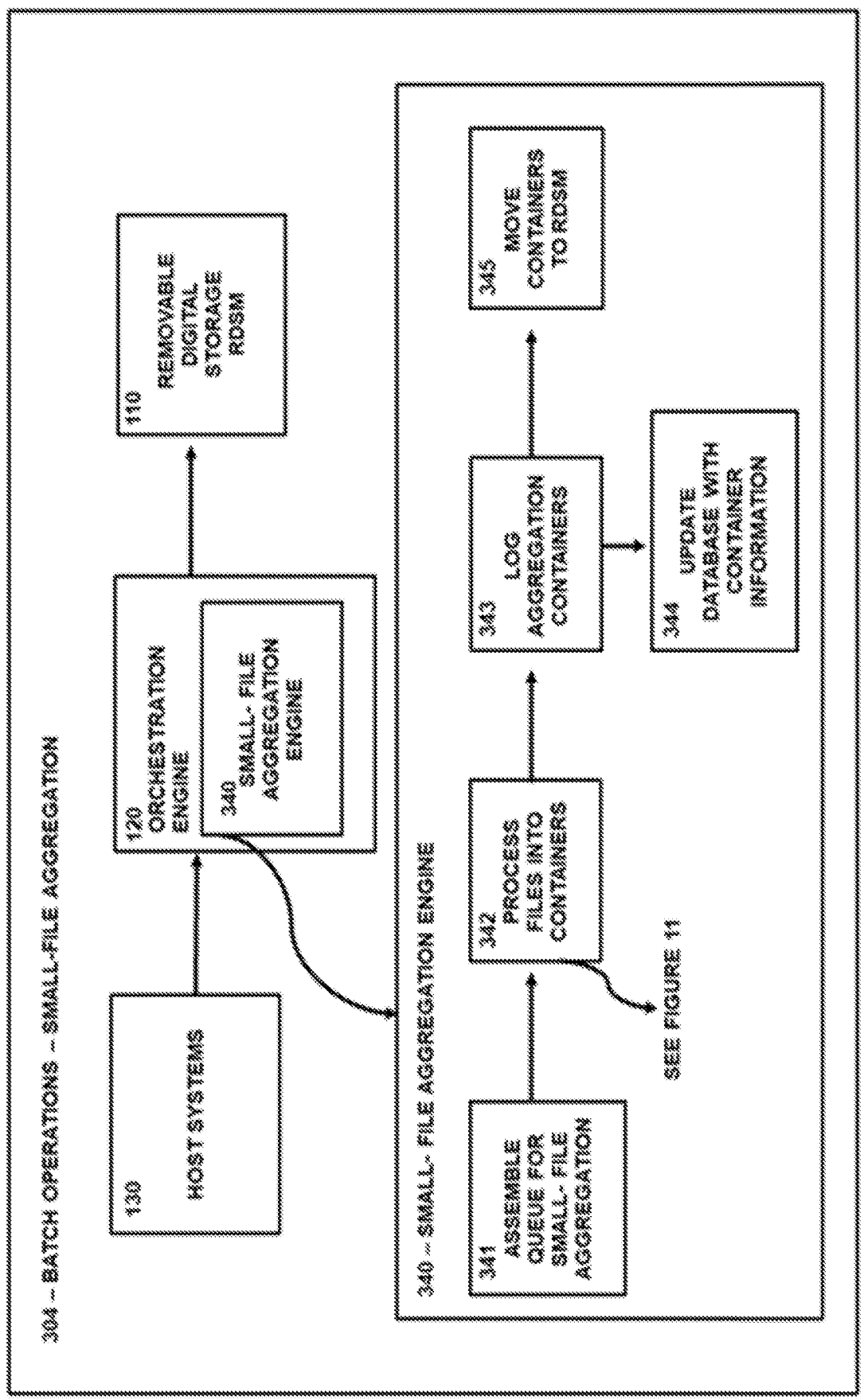
FIG. 10—Batch Operations—Small-File Aggregation: The methods for aggregating groups of small files across virtualized, aggregated RDSM in accordance with an embodiment of the present disclosure.

FIG. 10 shows during a batch operation a method in this embodiment for Small-File Aggregation 304 performed by engine 120. Some RDSM devices are better than others for storing small files, loosely defined as files under 1 MB in size, and as small as 1 or 2 K. Digital tapes using LTFS can suffer from the need to register each file as it is read into the system. Inefficiencies can also occur if a bundle of small files, that might number in the thousands for certain types of projects, might be spread over a tape causing an excess of tape movement queueing up files. Whatever the possible issue, engine 120 advantageously aggregates small files into a larger container in the same way that a Zip archive can hold a group of files and transport them as a single unit.

By batching files before they are processed by the system, engine 120 automates the process of aggregating small files into larger containers. The basic workflow 304 is like other previously described batch operations. Files along with their unique Path/Filename metadata are moved from Host Systems 130 to the Orchestration Engine 120, where a mode can be set to test for the presence of small files and to further process them in the Small-File Aggregation Engine 340 of engine 120. After processing, the larger container files are moved by engine 120 to the RDSM Array 110.

In the Small-File Aggregation Engine 340 files are first Assembled in a Queue for Small-File Aggregation 341. Engine 340 can use different metadata criteria to package small-files, including targeting all files below a certain file-size, targeting all files such that the aggregate size of all files surpasses a certain limit, targeting all files in certain types of sub-folders or project folders, etc. It is to be appreciated that any selection criteria may be used by engine 340 in accordance with the present disclosure. However, files are first selected and then aggregated by engine 340 into a single container 342 with their fully resolved Path/Filename metadata. The Container 342 is a file that contains files, and therefore it moves through the system as an object to be stored with other files. The Media Database 123 contains information about both the Container 342 and the files within it. Further detail of how files are processed into larger file-containers is described in relation to FIG. 11 below.

Once files have been successfully placed into containers, each Aggregation Container is Logged 343 by engine 340, such that the system is aware at the granular level of what files specifically, along with their relevant metadata, have been stored in which containers. The granular metadata file-details then update the Media Database 123 (FIG. 1) with the process Update Database With Container Information 344. The logic for filling Containers 342 is contained in the Application 121. Subsequently, the Containers are Moved to RDSM 110 in step 345.

Figure 11:
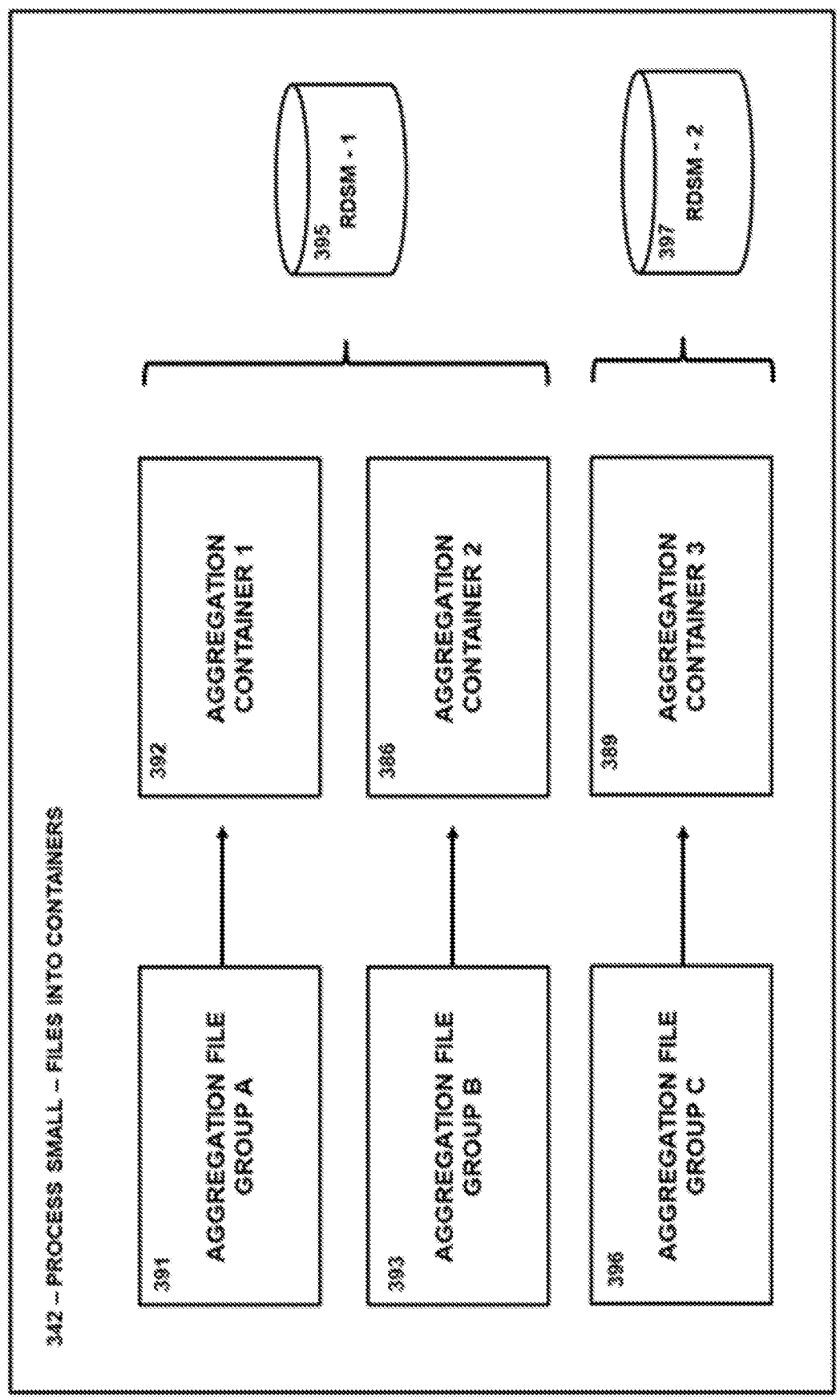
FIG. 11—Process Small-Files Into Containers: Further details about aggregating small-files into larger containers for more efficient processing in accordance with an embodiment of the present disclosure.

FIG. 11 shows in this embodiment further detail of a method to Process Small-Files into Containers 342 performed by engine 120. Aggregation file Groups 391, 393, are bundled into Aggregation Containers 392, 386 respectively. The Aggregation Containers 1, 2, and 3, 392, 386, and 389, are files that contain files, and are stored with all other files in the system. Both Aggregation Containers 392, 386 can be placed into RDSM-1 395 (i.e., a location in RSDM 110). This embodiment shows two Aggregation Containers going into a single RDSM. In other embodiments, the number of containers going into an RDSM is immaterial as long as there is storage space to fit them. In this embodiment, there is logic in engine 120 to put the right number of containers into a single RDSM. More generically, Aggregation File Groups like 396 are put into Aggregation Containers like 389, and the Aggregation Containers are placed into an RDSM 397. As noted, the specific files in each Aggregation Container, and the specific Aggregation Containers for each RDSM, are logged in the Media Database 123 (FIG. 1) such that each individual file can be found based on the unique value of Path/Filename enforced when files are placed into Aggregation Groups.

It is to be appreciated that the various features shown and described are interchangeable, that is a feature shown in one embodiment may be incorporated into another embodiment. It is further to be appreciated that the methods, functions, algorithms, etc. described above may be implemented by any single device and/or combinations of devices forming a system, including but not limited to personal computers, servers, storage devices, processors, memories, FPGAs, DSPs, etc.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One may implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A triplex data structuring system for managing data archived on a plurality of removable digital storage media (RDSM) comprising:

a plurality of physical libraries configured to manipulate, read, and manage the plurality of RDSM, each RDSM including a self-describing file system, the self-describing file system of each RDSM having a unique path/filename structure for each file stored on a respective RDSM relative to the other RDSMs;

a physical library manager configured to manage the plurality of physical libraries, the physical library manager includes a library database including a device ID and the self-describing file system of each RDSM of each library;

an orchestration engine configured to store media metadata associated with files and folders on the plurality of RDSM in at least one database table, generate unique numbers for each path and each path/filename structure, and read and write files to the plurality of RDSM, the at least one database table associates media metadata for each file to a unique path/filename structure of a respective file stored on a respective RDSM and to each generated unique number; and a virtualization engine for a host system, the virtualization engine configured to provide a contiguous view of all data files contained in the plurality of RDSM, without reference to the physical RDSM the data is stored on, by providing an aggregated file structure created by the media metadata across the plurality of RDSM, wherein the orchestration engine processes the media metadata upon a file request received from the virtualization engine, determines a location for the requested file using a respective generated unique number associated with the requested file, and sends the respective unique path/filename structure and determined location of the requested file to the physical library manager for retrieval of the requested file.

2. The system of claim 1, wherein the virtualization engine provides a link to the media metadata for the particular file or folder.

3. The system of claim 1, wherein the removable digital storage media (RDSM) is a Linear Tape File System (LTFS) tape.

4. The system of claim 3, wherein the physical library manager is configured to control the plurality of RDSM via a robotic device.

5. The system of claim 1, wherein the plurality of RDSM include at least one of an online device, a nearline device or an offline device.

6. The system of claim 1, wherein upon receipt of a file for storage, the orchestration engine stores the media metadata for the file in the least one database table, consults with the physical library manager to determine an available RDSM library and transfers a file essence of the file to a RDSM of the determined RDSM library.

7. The system of claim 6, wherein the orchestration engine determines the existence of a unique path on an available RDSM for the received file, wherein if the orchestration engine does not find the unique path, the orchestration engine creates the unique path and assigns the unique path a unique number.

8. The system of claim 7, wherein the determined path resides on at least two RDSM.

9. The system of claim 1, where data files are organized for placement on RDSM with a contiguous, unique file structure.

10. The system of claim 1, wherein an orchestration engine can execute asynchronous tasks in support of the management of data archived on various removable digital storage media, wherein the asynchronous tasks include at least one of chronological placement of data files on RDSM, inspection of files for malware, inspection of files for live-file filtering or aggregation of small files into larger containers.

11. The system of claim 1, wherein an orchestration engine is further configured to filter a plurality of files, wherein a first portion of the plurality of files are transmitted to at least one RDSM and a second portion of the plurality of files are stored on a cache of the host system for faster retrieval.

12. The system of claim 1, wherein an orchestration engine is further configured to aggregate files that are less than a predetermined size in a container file and transmit the container file to at least one RDSM as a single unit.

13. The system of claim 1, wherein a triplex data structure system can be duplicated for redundancy, with all data creation, updates, and deletions automatically duplicated from the first system to the second system.

14. The system of claim 1, wherein more than two triplex data structures are chained and duplicated with all data creation, updates, and deletions automatically duplicated and cascaded from the first system to all others.

15. A computer program product comprising non-transitory computer readable medium comprising a set of instructions for creating and managing:
 a plurality of physical libraries configured to manipulate, read, and manage a plurality of removable digital storage media (RDSM), each RDSM including a self-describing file system, the self-describing file system of each RDSM having a unique path/filename structure for each file stored on a respective RDSM relative to the other RDSMs;
 a physical library manager configured to manage the plurality of physical libraries, the physical library manager includes a library database including a device ID and the self-describing file system of each RDSM of each library;
 an orchestration engine configured to store media metadata associated with files and folders on the plurality of RDSM in at least one database table, generate unique numbers for each path and each path/filename structure, and read and write files to the plurality of RDSM, the at least one database table associates media metadata for each file to a unique path/filename structure of a respective file stored on a respective RDSM and to each generated unique number; and
 a virtualization engine for a host system, the virtualization engine configured to provide a contiguous view of all files contained in the plurality of RDSM, without reference to the physical RDSM the data is stored on, by providing an aggregated file structure created by the media metadata across the plurality of RDSM,
 wherein the orchestration engine processes the media metadata upon a file request received from the virtualization engine, determines a location for the requested file using a respective generated unique number associated with the requested file, and sends the respective unique path/filename structure and determined location of the requested file to the physical library manager for retrieval of the requested file.

16. A method for reconstructing an original triplex data structuring system that supports the management of data archived on a plurality of removable digital storage media (RDSM) comprising:
 exporting file structures from each discrete RDSM from the plurality of RDSM, each file structure of each discrete RDSM having unique paths and unique filenames within the paths relative to the other RDSM;
 reading a first exported file structure and aggregating file structures retrieved from subsequent RDSM devices to the first exported file structure;
 creating at least one database table including the unique paths and the unique filenames within the paths to reference specifically where each path and file can be found on a respective RDSM of the plurality of RDSM, the at least one database table includes metadata associated with each file; and
 assembling an aggregated file structure and the at least one database table, along with the original plurality of RDSM, to form an exact copy of the original triplex data structuring system, wherein the aggregated file structure is used to generate unique path and path/filename numbers that are associated with each file and stored in the at least one database table.

17. The system of claim 1, wherein the determined location includes the device ID.

* * * * *